(12) United States Patent
Mori et al.

(10) Patent No.: US 6,293,303 B1
(45) Date of Patent: Sep. 25, 2001

(54) VALVE POSITION DETECTOR

(75) Inventors: Akiyoshi Mori, Yokohama; Makoto Adegawa, Kawasaki; Haruki Kobayashi, Fujisawa, all of (JP)

(73) Assignee: Fuji Oozx Corporation, Kanagawa (JP)

(*) Notice: Subject to any disclaimer, the term of this patent is extended or adjusted under 35 U.S.C. 154(b) by 0 days.

(21) Appl. No.: 09/410,821

(22) Filed: Oct. 1, 1999

(30) Foreign Application Priority Data

Oct. 20, 1998 (JP) .................................................. 10-297690
Aug. 30, 1999 (JP) .................................................. 11-243069

(51) Int. Cl.$^7$ .................................................. F16K 37/00
(52) U.S. Cl. ................. 137/554; 123/90.11; 340/870.37; 324/682
(58) Field of Search ....................... 137/554; 123/90.11; 324/660, 681, 682, 686; 340/870.37

(56) References Cited

U.S. PATENT DOCUMENTS

| 4,862,063 | 8/1989 | Kobayashi et al. . |
| 5,418,468 | 5/1995 | Baker et al. . |
| 5,898,298 | * 4/1999 | Brandsma et al. ................ 324/682 X |
| 5,983,847 | * 11/1999 | Miyoshi et al. ................... 123/90.11 |

* cited by examiner

Primary Examiner—John Rivell

(57) ABSTRACT

A poppet valve moves up and down in a valve operating mechanism in an internal combustion engine. A fixed electrode is supported on a cylinder head, and a moving electrode is carried by the poppet valve. The fixed electrode is connected to a circuit, which together comprises a variable condenser and a resistance. The valve moves up and down during firing operation of the engine. Variation in electrostatic capacitance is detected by means of the two electrodes, transmitted to the circuit via a lead and a ground connection, and converted to a voltage by the circuit, thereby enabling detecting valve position more exactly.

5 Claims, 10 Drawing Sheets

VALVE POSITION DETECTOR

BACKGROUND OF THE INVENTION

The present invention relates to a valve position detector which exactly detects a position of a valve during firing in an engine.

When components in a valve operating mechanism are changed in specification, an actual position of a poppet valve is measured to evaluate the components depending on movement characteristics or to investigate followability of the valve to a cam. For measurement, an axial position of the valve or components which move therewith such as a valve spring retainer is detected by a sensor.

However, in a direct-acting type valve operating mechanism, not only an axial end of the valve, but also a valve spring retainer, which is mounted via a cotter, is positioned in a cap-like tappet. In a relatively small engine, there is no space for the sensor around the valve operating mechanism, so it is very difficult to detect position of the valve or valve spring retainer directly. Therefore, a piston and a connecting rod are detached from a cylinder block of the engine, and a non-contacting displacement sensor, such as an approach sensor, is provided just under the valve in the cylinder. By operating the engine on a support, axial displacement of the valve is determined at a valve head.

Such measurement on the support is not the same as actual measurement of the valve during firing of the engine. Combustion pressure in the cylinder or an influence to the valve such as back pressure of an exhaust system, cannot be determined exactly. In such measurement using the approach sensor, detection accuracy is poor.

Instead of a valve operating mechanism by an ordinary cam, various electromagnetic valve drivers are suggested to open and close a valve by magnetic force.

In such a valve drive system, to control opening/closing time of the valve exactly depending on an operating condition of the engine, and to enable feedback control of electric current to an electromagnet for a driving valve, it is indispensable to provide a valve position detector to detect a present position of the valve at high accuracy. Thus, there is a need to provide a high accuracy valve position detector instead of the above close small approach sensor.

SUMMARY OF THE INVENTION

In view of the disadvantages in the prior art, it is an object of the invention to provide a small valve position detector for determining a valve position with high accuracy during firing of an engine, regardless of the kind of a valve operating system used.

DESCRIPTION OF THE DRAWINGS

The features and advantages of the present invention will become more apparent from the following description with respect to embodiments as shown in appended drawings wherein.

DETAILED DESCRIPTION OF THE PREFERRED EMBODIMENT(S)

Figure 1:
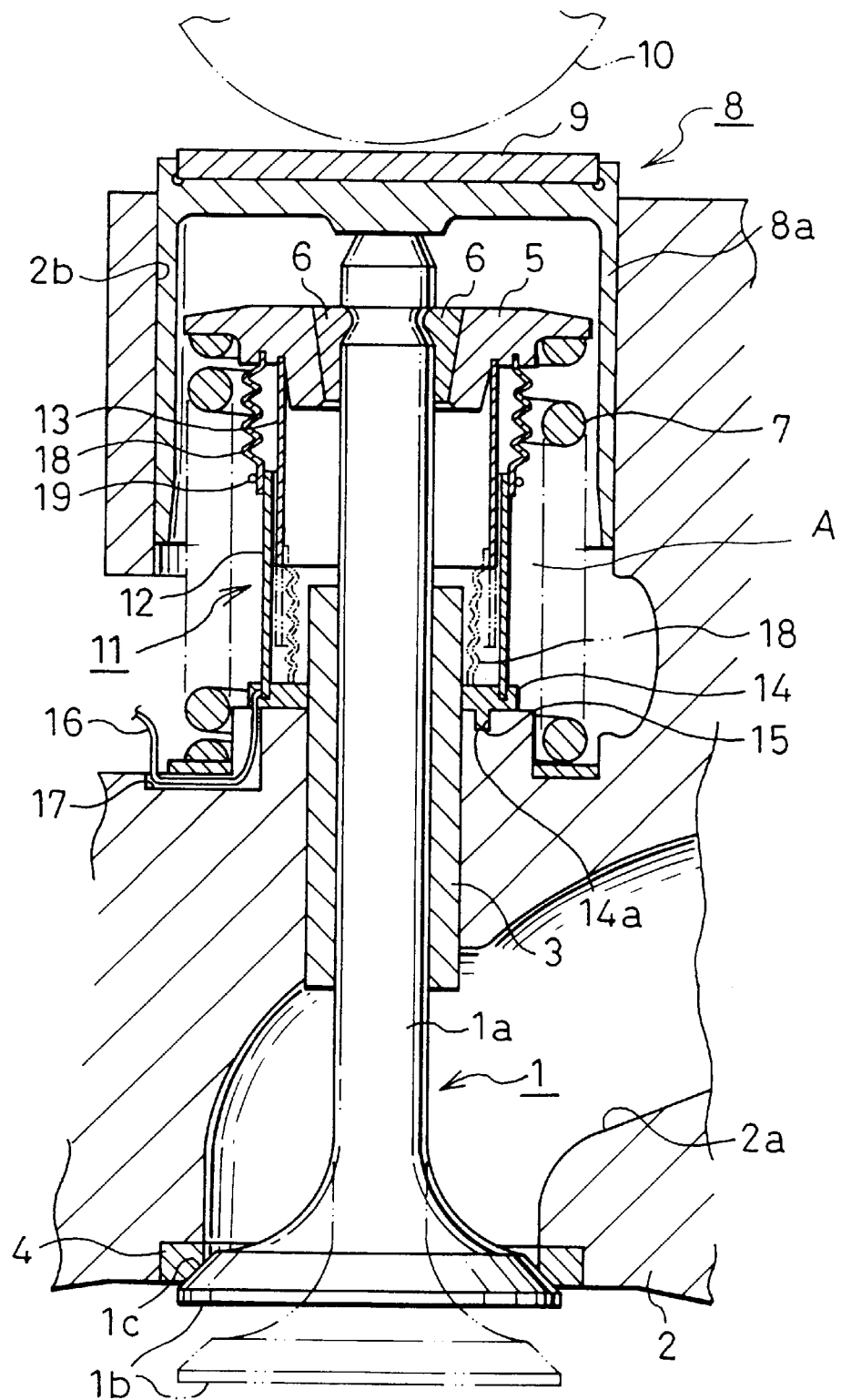
FIG. 1 is a central vertical sectioned front view of a direct-acting type valve operating mechanism in a first exemplary embodiment of a valve position detector in accordance with principles of the invention.

FIG. 1 illustrates a direct-acting type valve operating mechanism in one embodiment of the present invention, in which a valve stem 1a of a poppet valve 1 is slidably supported by a valve guide 3 which is fitted above an intake or exhaust port 2a of a cylinder head 2.

A tapered valve face 1c of a valve head 1b at the lower end of the valve 1 is engaged on a valve seat 4 which is a press fit in the port 2a of the cylinder head 2.

A valve spring retainer 5 is held via a pair of cotters 6 at the upper end of the valve stem 1a, and a valve spring 7 is provided between the valve spring retainer 5 and the cylinder head 2. The valve stem 1a of the valve 1 is concentrically surrounded by the valve spring 7.

At the upper end of the valve stem 1a of the valve 1, the valve spring retainer 5 and the valve spring 7A are covered with a cylindrical tappet 8 in which the upper end is closed. A cylindrical portion 8a of the tappet 8 is slidably engaged in a vertical guide bore 2b of the cylinder head 2.

A cam 10 is slidably engaged on a shim 9 which fits in a recess at the upper surface of the tappet 8. By rotation of the cam 10, the valve 1 is pressed downwards against the valve spring 7, so that opening and closing are carried out.

A variable capacitance electrode 11 for forming a displacement sensor with a circuit as below is provided around the valve stem 1a of the valve 1 in an annular space "A" which is defined by the valve stem 1a of the valve 1, the valve guide 3 which is projected on the cylinder head 2, and the valve spring 7.

The variable capacitance electrode 11 comprises a cylindrical fixed electrode 12 and a conductive cylindrical moving electrode 13 which has an outer diameter slightly smaller than an inner diameter of the fixed electrode 12. A lower half of the moving electrode 13 is provided in an upper half of the fixed electrode 12 with a predetermined gap to form an opposing area variable electrode or an variable condenser (capacitor).

The lower end of the fixed electrode 12 is concentrically fixed with the valve 1 via an insulating support plate 14 made of synthetic resin or ceramics. The support plate 14 is placed on the upper surface of the cylinder head 2 at the upper portion of the valve guide 3. The support plate 14 has one or more projections 14a on the lower surface. The projection 14a is engaged in a recess 15 of the cylinder head 2 to prevent rotation of the support plate 14 around an axis. The upper end of the moving electrode 13 is fixed on the lower surface of the valve spring retainer 5 so that the moving electrode 13 is concentric with the valve 1.

The fixed electrode 12 is made of stainless steel, Al alloy or Cu alloy, and the moving electrode 13 is made of light metal alloy such as Al alloy to lighten it. The valve spring retainer 5 is preferably lightened by weight of the moving electrode 13 to prevent an increase in inertial mass. The moving electrode 13 is electrically connected to the cylinder head 2, an engine body or the body of a car as earth potential (ground) via the valve spring retainer 5, valve spring 7, cotter 6, valve 1, valve guide 3, etc.

A lead 16 for routing an electrical power output is connected to the fixed electrode 12, and is introduced out of the valve spring 7 through a wiring groove 17 of the cylinder head 2. The end of the lead 16 is connected to a circuit of an external measuring instrument (not shown).

Between the fixed electrode 12 and the valve spring retainer 5, there is provided a bellows-like tubular cover 18 which is vertically flexible depending on movement of the valve spring retainer 5, and which is made of rubber or synthetic resin. The upper and lower ends of the tubular cover 18 are fixed to the lower surface of the valve spring retainer 5 and the outer circumferential surface of the fixed electrode 12 respectively. Numeral 19 denotes a tightening ring. The tubular cover prevents lubricating oil or another foreign substance from invading between the electrodes 12 and 13 to increase measurement accuracy.

Figure 3:
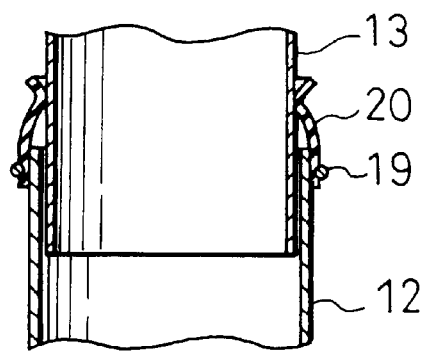
FIG. 3 is a vertical sectional view of a variation of a cover of FIG. 1.

As shown in FIG. 3, the lower end of an insulating tubular cover or sealing member 20 made of rubber or synthetic resin may be fixed on the outer circumferential surface of the upper end of the fixed electrode 12 by the tightening ring 19, and the inner circumferential surface of the upper end is elastically pressed on the outer circumferential surface of the moving electrode 13 to prevent foreign substances from invading into and between the electrodes 12 and 13. The cover 18 may comprise a soft rubber diaphragm.

Figure 2:
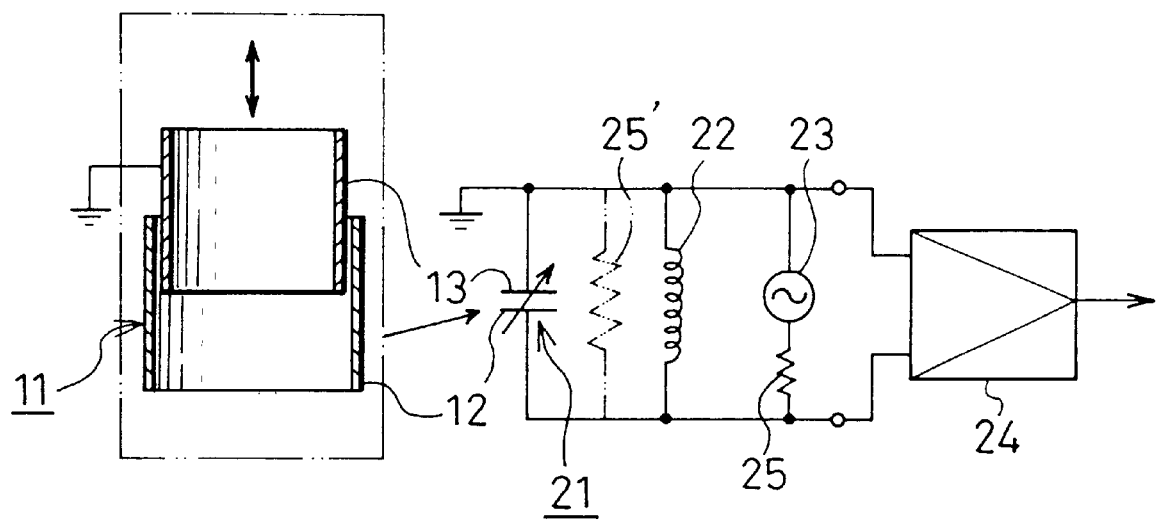
FIG. 2 is a schematic view of an electrostatic capacitance sensor circuit with a variable capacitance electrode in FIG. 1.

FIG. 2 illustrates a circuit for determining the position of the valve by converting a variation in electrostatic capacitance between the fixed and moving electrodes 12 and 13 to voltage which is outputted. An electrostatic displacement sensor is formed by the electrodes 12, 13 and the circuit.

A variable condenser 21 comprises a fixed electrode 12 and a moving electrode 13 as the variable capacitance electrode 11, and the moving electrode 13 is provided as earth potential (grounded).

The electrodes 12, 13 of the variable condenser 21 are connected in parallel with a coil 22 and a high frequency power source 23 in series with a resistance 25. A terminal voltage of a parallel circuit which comprises the variable condenser 21 and a coil 22 is amplified by an amplifier 24 and outputted, so that a position of the valve 1 is converted to a voltage, which is measured.

Owing to opening/closing position of the valve 1, an opposing area between the electrodes 12 and 13 is varied to cause variation in electrostatic capacitance and impedance. Output voltage is proportionally changed, thereby detecting the position of the valve 1 at high accuracy.

To obtain stable output characteristics, a resistance 25' may be connected to the circuit. A circuit for temperature compensation of the sensor may be added, but is not shown.

As mentioned, in the foregoing embodiment the electrostatic displacement sensor is formed in an opposing area varying shape. The variable capacitance electrode 11 which comprises the fixed and moving electrodes 12 and 13 is tubular to decrease axial size of the variable capacitance electrode 11, so that the electrodes 12, 13 can be provided in a small gap between the valve 1 and the valve spring 7. In a direct-acting type valve operating mechanism including a tappet 8, which presents difficulty in measurement, the actual position of the valve 1 can be determined at high accuracy during the firing operation. When components in a valve operating mechanism are modified in specification, an actual position of the valve 1 is exactly determined to evaluate valve-operating components and study followability of the valve 1 to the cam 10.

Figure 4:
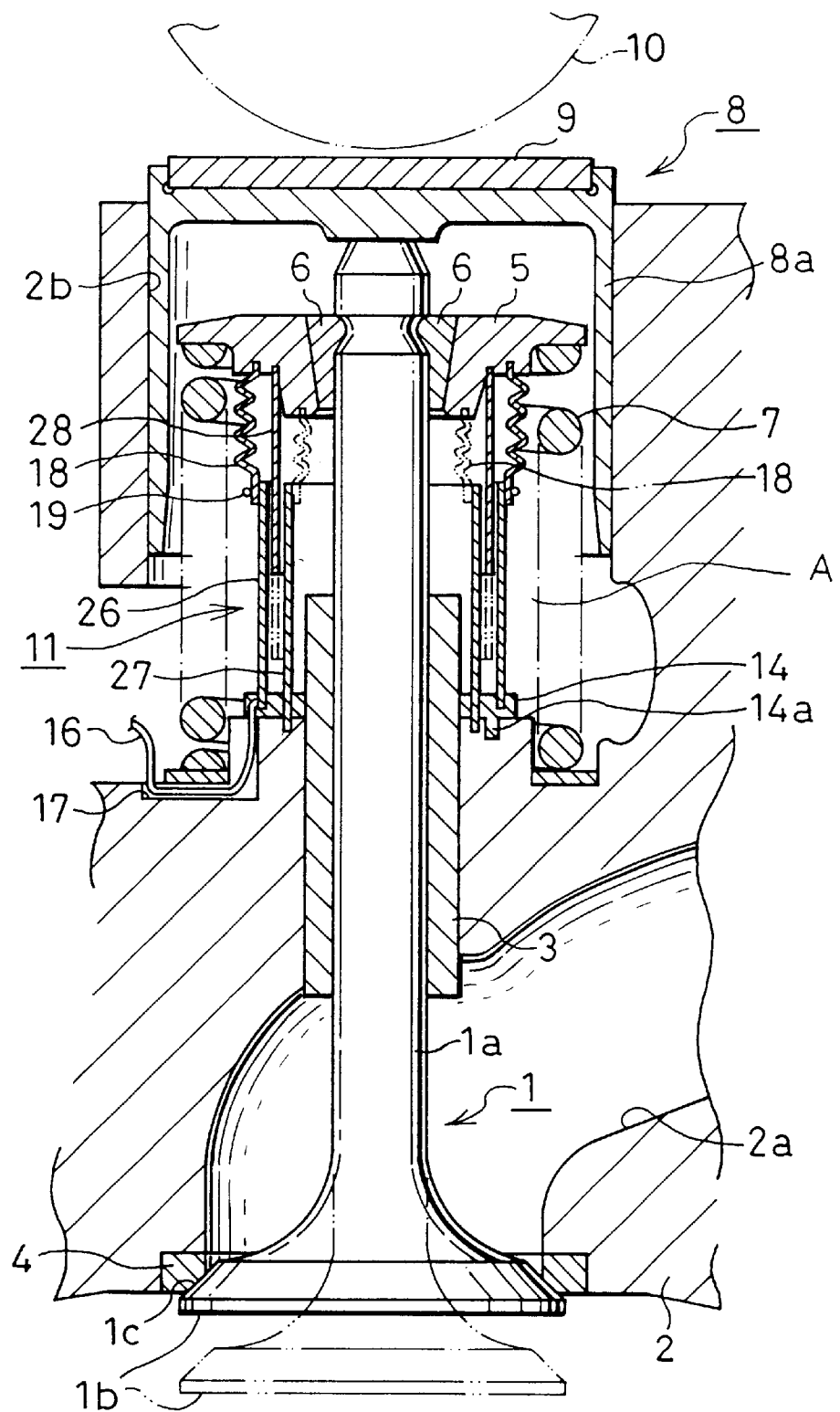
FIG. 4 is a central vertical sectioned front view of a direct-acting type valve operating mechanism in a second exemplary embodiment of a valve position detector in accordance with principles of the invention.

FIG. 4 illustrates a second embodiment of the invention. This embodiment is different from the first embodiment only as to the variable capacitance electrode. The same numerals are allotted to the same members in the foregoing embodiment, and its detailed description is omitted.

The variable capacitance electrode 11 comprises a first conductive cylindrical fixed electrode 26 fixed concentrically with a valve to an insulating support plate 14, a second conductive cylindrical fixed electrode 27 which is smaller in diameter than the first fixed electrode 26, and an insulating cylindrical dielectric 28 the upper end of which is fixed to the lower surface of a valve spring retainer 5 so that a lower half of the dielectric 28 may be inserted in a small gap between the electrodes 26 and 27 with play.

The first fixed electrode 26 is connected to an outside circuit via a lead 16 similar to the first embodiment, and the second fixed electrode 27 is electrically connected to a cylinder head 2 as an earth potential (grounded).

The first and second fixed electrodes 26 and 27 constitute a condenser to form a circuit similar to that in FIG. 2. Thus, electrostatic capacitance displacement sensor, or an inductivity variable displacement sensor is formed according to action of a dielectric 28. The dielectric 28 between the first and second fixed electrodes 26 and 27 moves up and down to vary inductance and electrostatic capacitance between the electrodes 26 and 27. Therefore, variation in the electrostatic capacitance is converted to a voltage and outputted, thereby indicating the position of the valve.

In the illustrated embodiment, only the second fixed electrode 27, which is thin and cylindrical, is all that is added thereby avoiding a large size of the variable capacitance electrode 11. Similar to the foregoing embodiment, a position of the valve 1 can be determined when it is connected to a direct-acting type valve operating mechanism similar to the foregoing embodiment.

Figure 5:
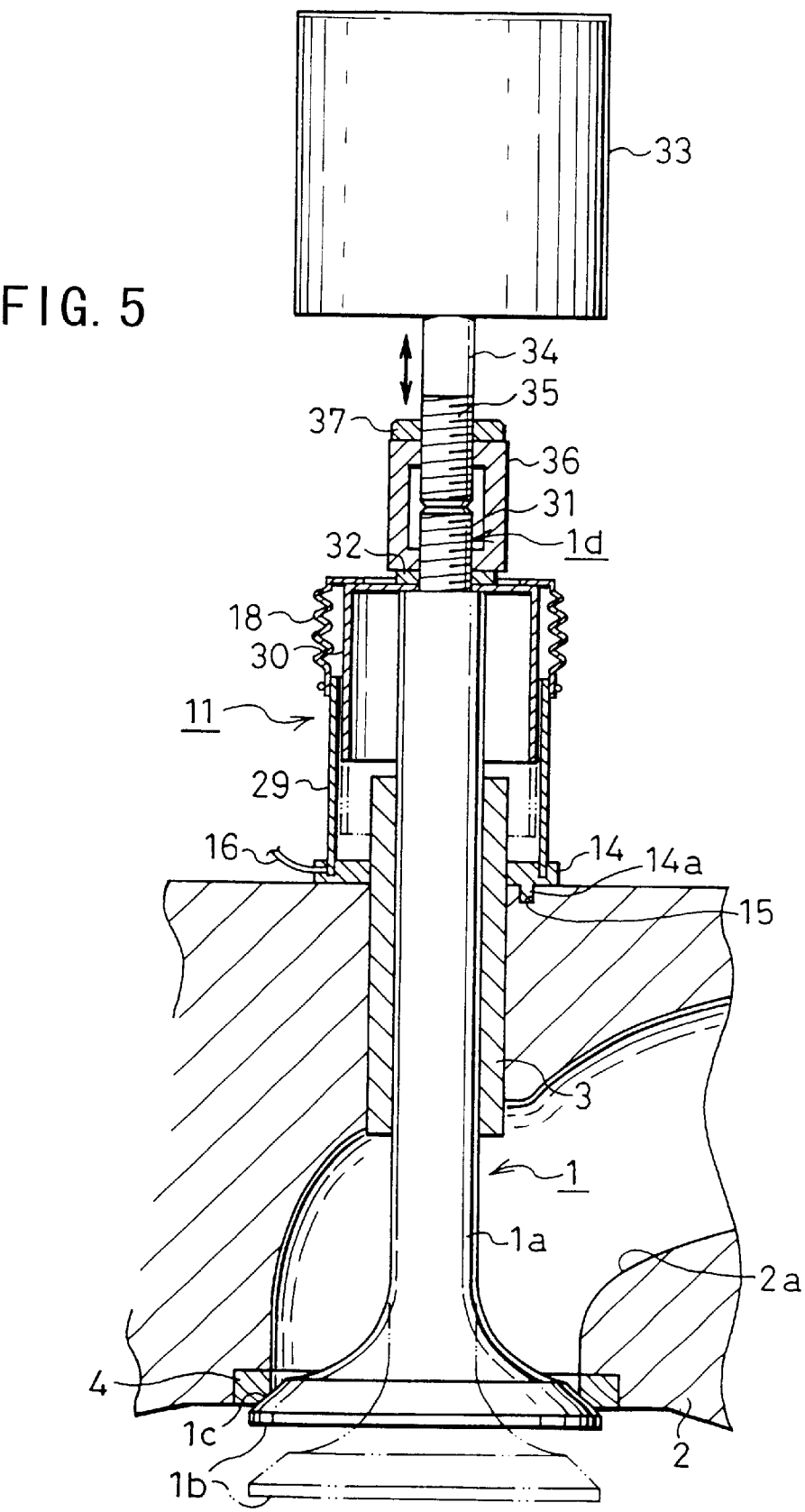
FIG. 5 is a central vertical sectioned front view of a direct-acting type valve operating mechanism in a third exemplary embodiment of a valve position detector in accordance with principles of the invention.

FIG. 5 illustrates a third embodiment of the invention, which is applied to a valve operating mechanism which includes an electromagnetic actuator. The same numerals are allotted to the same members as those in the foregoing embodiments. An insulating support plate 14 surrounds a valve guide 3 on the upper surface of the cylinder head 2. The lower end of a fixed electrode 29 similar to that in FIG. 1 is concentrically fixed on the support plate 14.

A conductive cylindrical moving electrode 30 is fixed to a smaller diameter valve stem 1d at the upper end of a valve stem 1a of a valve 1 by a fixing plate 32 which is engaged on a thread 31 of the smaller diameter valve stem 1d. The fixed and moving electrodes 29 and 30 constitute an opposing area variable capacitance electrode (condenser) 11 similar to that in FIG. 1. The moving electrode 30 is defined as earth potential (grounded), and a lead 16 connected to the fixed electrode 29 is connected to an outside measuring instrument to constitute a circuit as shown in FIG. 2 to form a electrostatic capacitance displacement sensor.

Between an outer circumferential surface of the upper end of the fixed electrode 29 and an upper end of the moving electrode 30, a bellows-like tubular cover 18 similar to that described above is mounted to prevent foreign substances from invading between the electrodes 29 and 30.

An electromagnetic actuator 33 is provided on the upper end of the valve 1. The lower end of a drive shaft 34 of the actuator 33 is connected to the upper end of the valve 1 by a connecting member 36 which is engaged with an external thread 35 of the shaft 34 and an external thread 31 of a smaller diameter shaft 1d of the valve 1. Numeral 37 denotes a lock nut.

The electromagnetic actuator 33 does not directly relate to the present invention, and its structure is not described in detail. For example, in the actuator 33, an iron piece which is connected to the drive shaft 34 is provided between a pair of upper and lower electromagnets, and an electric current to the upper and lower electromagnets is controlled to drive the iron piece up or down to drive the valve 1 depending on operational condition of an engine.

In this embodiment, an actual position of the valve 1 can be determined at high accuracy during firing operation of the engine. Thus, owing to feed-back control of the electromagnetic actuator 33 based on a signal thus determined, opening/closing time of the valve can be optimally controlled depending on operation condition of the engine.

The variable capacitance electrode 11 may comprise an inductively variable electrodes shown in FIG. 4 in this embodiment, but is not shown. A sealing member as shown in FIG. 3 may be used instead of the bellows-like tubular cover 18.

Figure 6:
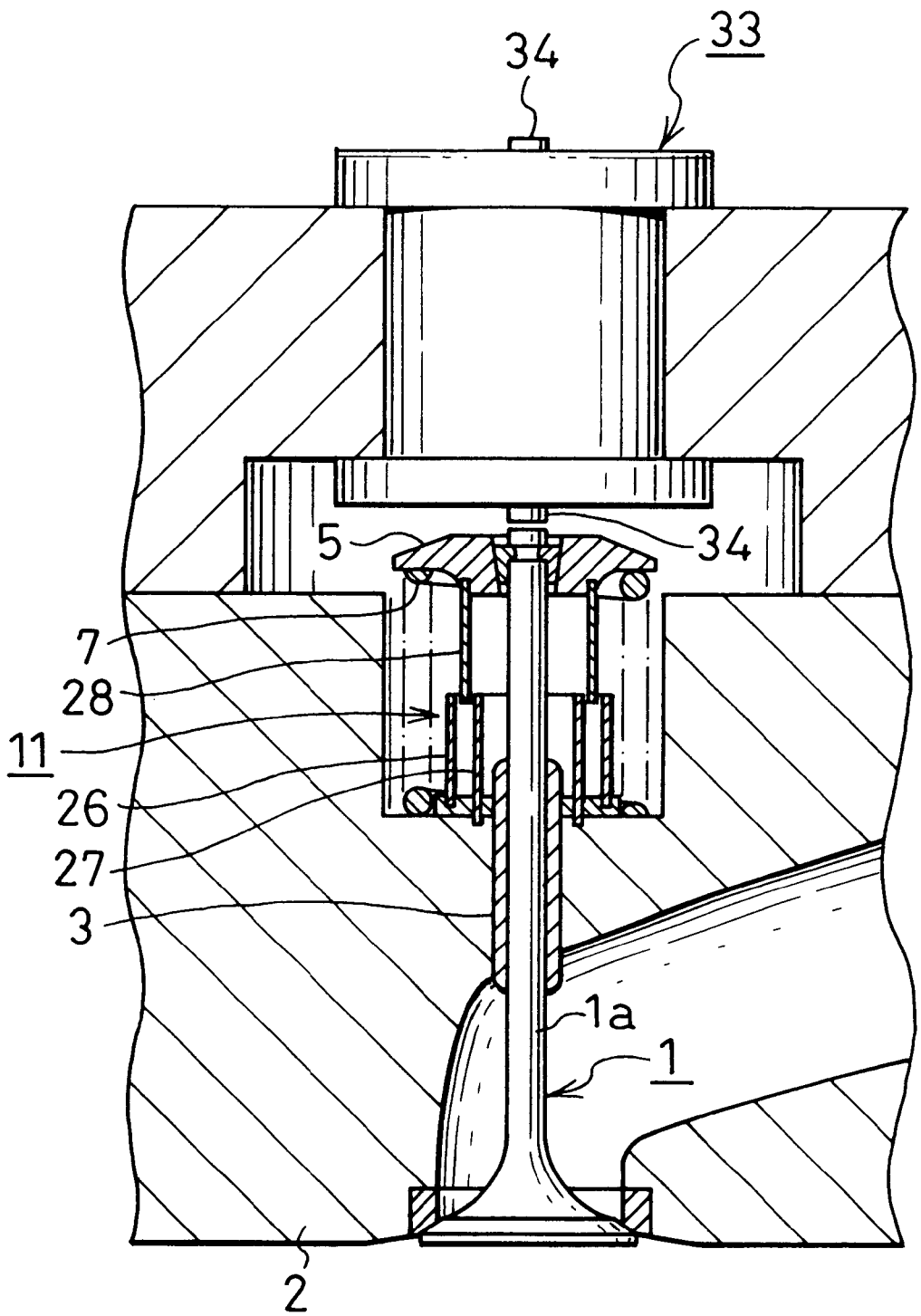
FIG. 6 is a central vertical sectioned front view of a direct-acting type valve operating mechanism in a fourth exemplary embodiment of a valve position detector in accordance with principles of the invention.
Figure 7:
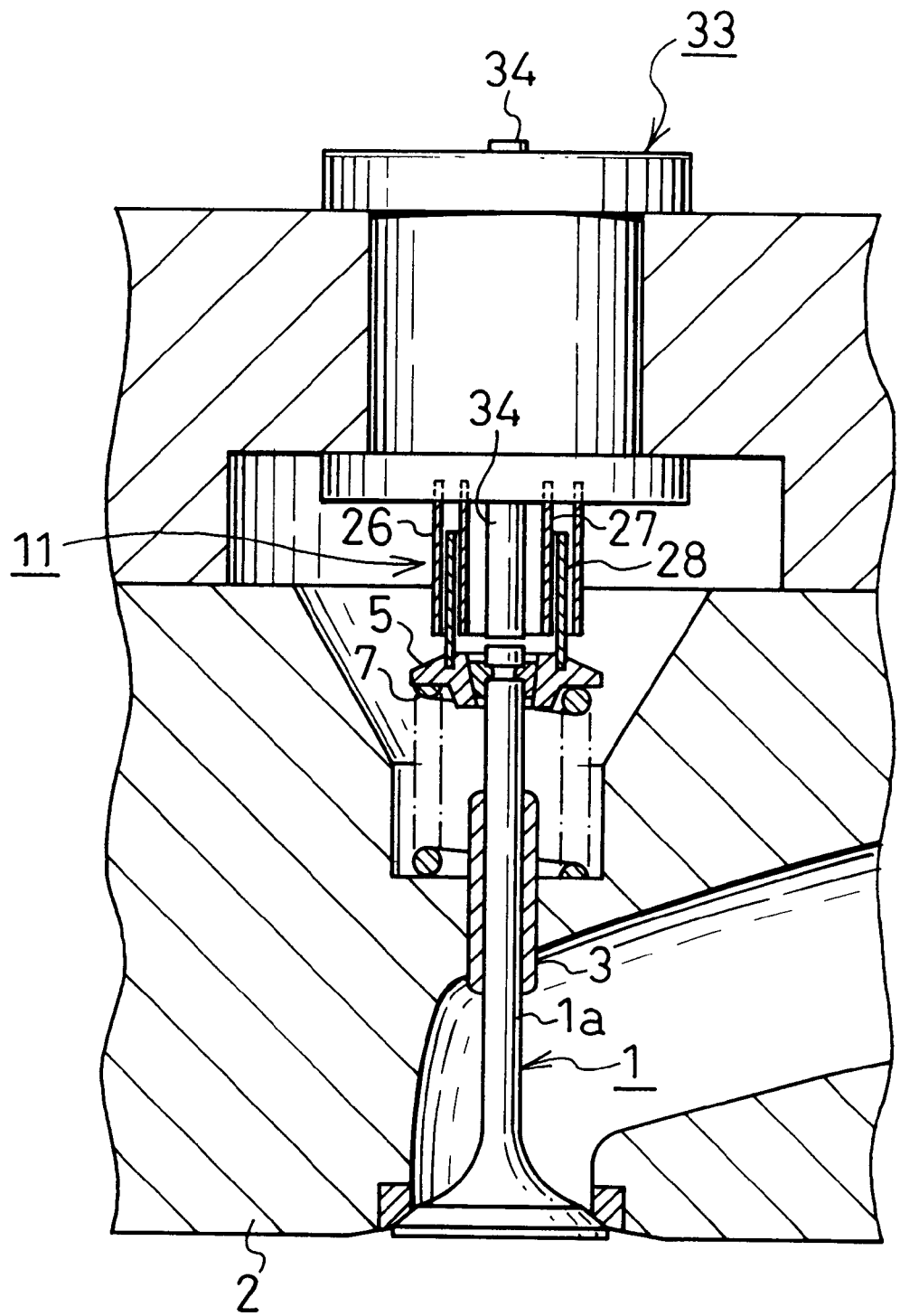
FIG. 7 is a central vertical sectioned front view of a direct-acting type valve operating mechanism in a fifth exemplary embodiment of a valve position detector in accordance with principles of the invention.
Figure 8:
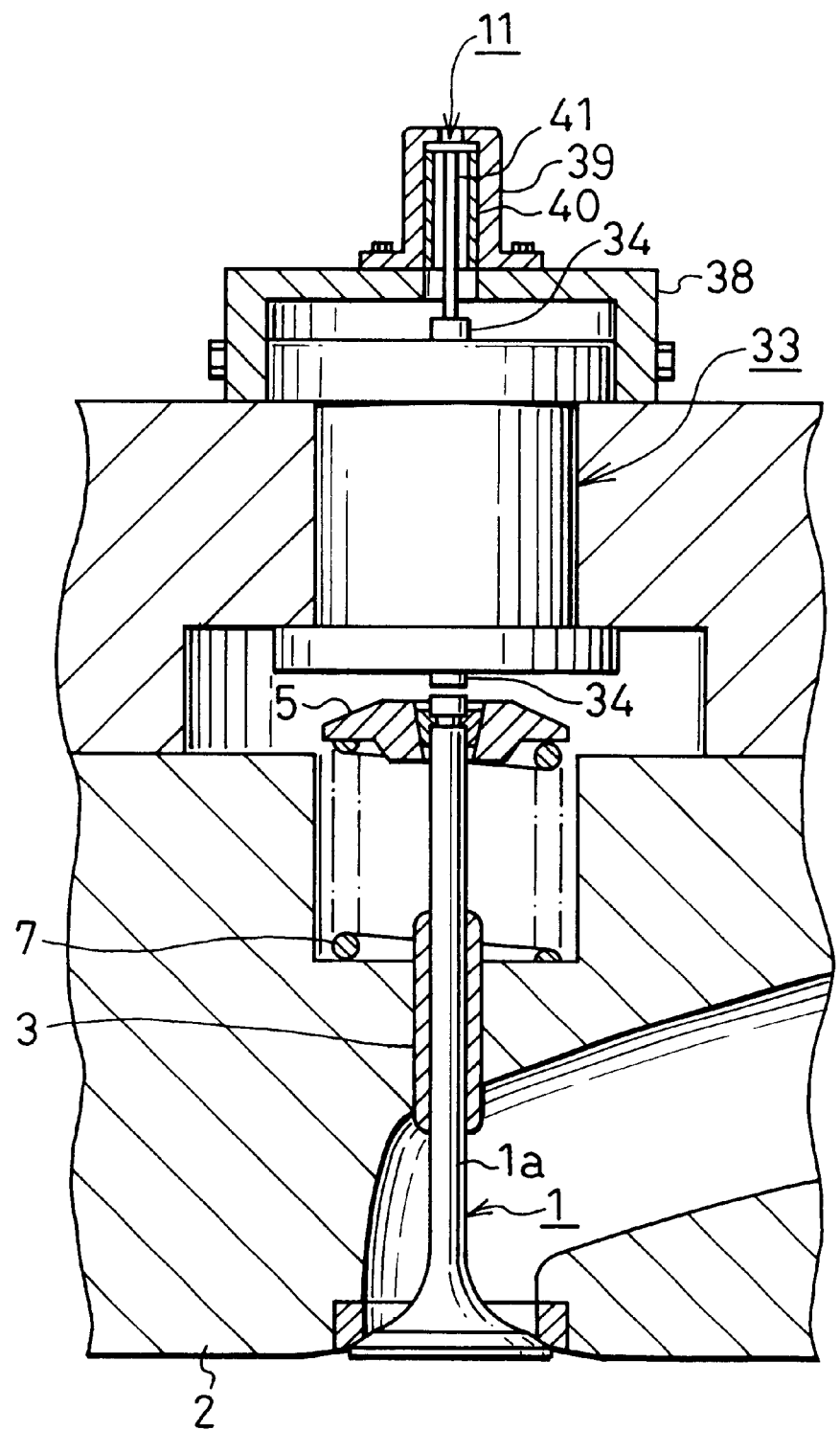
FIG. 8 is a central vertical sectioned front view of a direct-acting type valve operating mechanism in a sixth exemplary embodiment of a valve position detector in accordance with principles of the invention.

FIGS. 6 to 8 illustrate embodiments in which the present invention is applied to a valve operating mechanism which has an electromagnetic actuator. In the fourth embodiment of FIG. 6, an inductivity variable capacitance electrode 11 which comprises a first fixed electrode 26, a second fixed electrode 27, and a dielectric 28, is provided between a cylinder head 2 and valve spring retainer 5. When a valve 1 is driven by a vertical position change of a drive shaft 34 of an electromagnetic actuator 33 above a valve stem 1a of the valve 1, its position is detected.

In the fifth embodiment of FIG. 7, a variable capacitance electrode 11 is provided between a valve spring retainer 5 and an electromagnetic actuator 33. First and second fixed electrode 26 and 27 are fixed on the lower surface of an electromagnetic actuator 33 concentrically with the valve 1, and a dielectric 28 is fixed on the upper surface of the valve spring retainer 5.

In the sixth embodiment of FIG. 8, an opposing area variable capacitance electrode 11 is provided above an electromagnetic actuator 33. A cap-like insulating electrode holder 39 is mounted in the middle of the upper surface of a bracket 38 fixed to the upper end of the electromagnetic actuator 33. A conductive cylindrical fixed electrode 40 is engaged in the inner surface of the electrode holder 39. A conductive rod-like moving electrode 41 is integrally formed with a drive shaft 34 which is projected from the upper end of the electromagnetic actuator 33. The moving electrode 41 is engaged in the fixed electrode 40 with play to form the opposing area variable capacitance electrode 11.

In the embodiments in FIGS. 6 and 7, the variable capacitance electrode 11 may be formed as an opposing area varying form similar to that in FIG. 1, but is not shown.

In the embodiments in FIGS. 6 to 8, the drive shaft 34 is moved up and down owing to operation of the electromagnetic actuator 33, and opening/closing position of the valve 1 changes the electrostatic capacitance of the electrodes 26, 27 and 40, so that vertical position of the valve 1 can be detected directly or indirectly via the drive shaft 34.

As shown in the embodiment in FIG. 7, the variable capacitance electrode 11 is provided between a valve spring retainer 5 and the electromagnetic actuator 33. Therefore, an outer diameter of the electrode is not limited. Flexibility in design of the electrodes and valve operating parts is increased, which is advantageous compared with positioning the electrodes within a valve spring 7. Sprays of lubricating oil are not deposited on the electrodes, preventing measurement error resulting from deposited oil adhering to the electrodes.

As shown in FIG. 8, the variable capacitance electrode 11 is provided above the electromagnetic actuator 33 to prevent adhesion of lubricating oil to the electrodes, thereby achieving higher accuracy measurements and facilitating maintenance.

Figure 9:
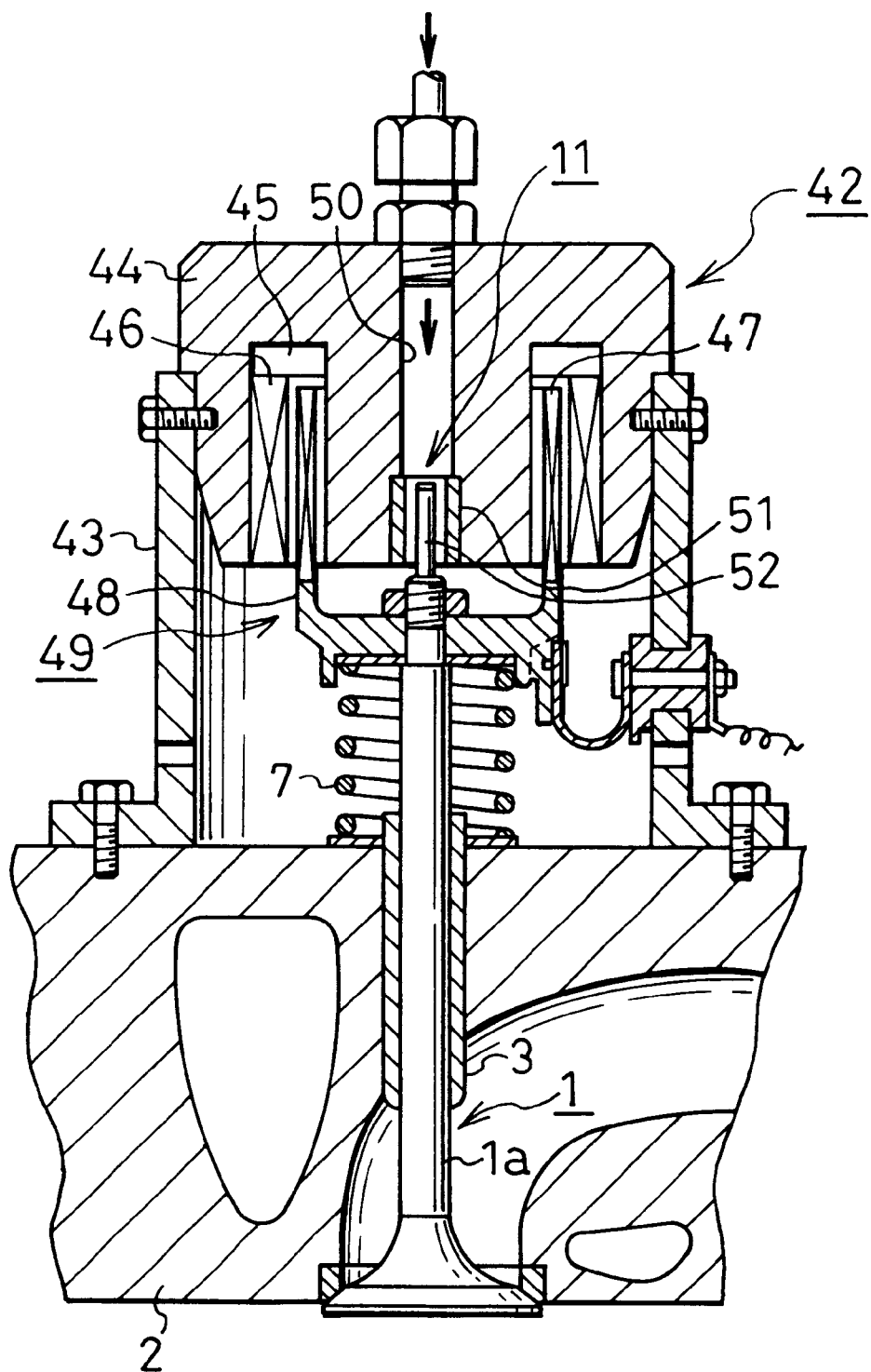
FIG. 9 is a central vertical sectioned front view of a direct-acting type valve operating mechanism in a seventh embodiment of a valve position detector in accordance with principles of the invention.
Figure 10:
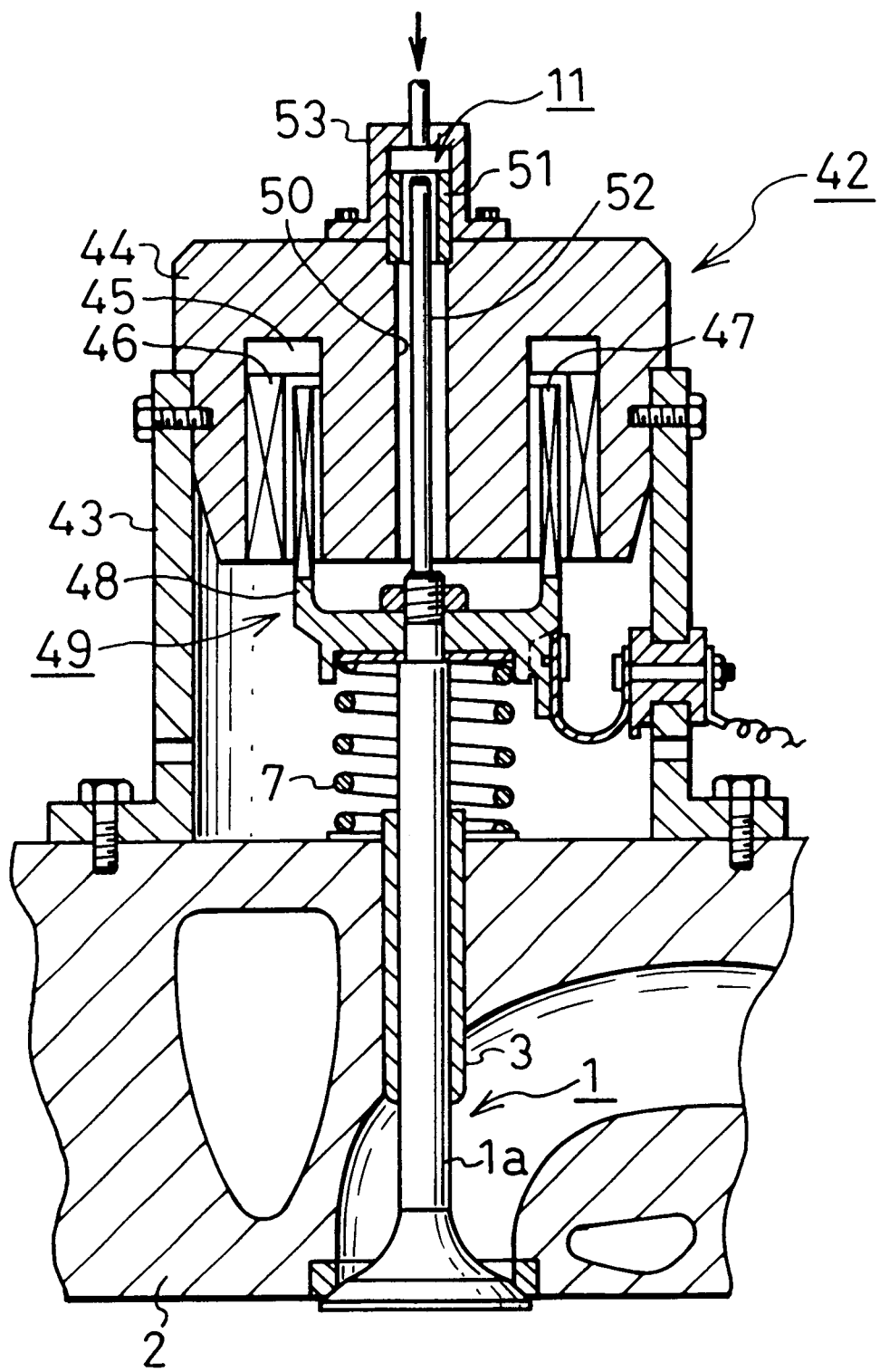
FIG. 10 is a central vertical sectioned front view of a direct-acting type valve operating mechanism in an eighth embodiment of a valve position detector in accordance with principles of the invention.

FIGS. 9 and 10 illustrate seventh and eighth embodiments, in which the present invention is applied to an electromagnetic actuator type valve operating mechanism called a voice coil motor.

A electromagnetic actuator 42 as shown in FIGS. 9 and 10 comprises an iron yoke 44 concentrically fixed with a valve 1 on the upper surface of a cylinder head 2 via a cylindrical bracket 43. A cylindrical permanent magnet 46 is fixed in an annular space 45 of the yoke 44 so as to have an outer N pole and an inner S pole (or vice versa). A valve driver 49, which has a cylindrical bobbin 48 fixed to the upper end of the valve is disposed between the permanent magnet 46 and the yoke 44. A moving coil 47 is wound around the bobbin 48. When an electric current is applied to the moving coil 47, radial magnetic flux is formed between the coil 47 and permanent magnet 46. An axial force is generated with respect to the moving coil 47, according to Fleming's Left Hand Rule, to move the valve driver 49 axially to open and close the valve 1.

In the embodiment shown in FIG. 9, a variable capacitance electrode 11 is provided between the upper end of the valve 1 and the lower end of an air hole 50 at the center of the yoke 44 disposed coaxially with the valve 1. A cylindrical conductive fixed electrode 51 fits on the inner surface of the lower portion of the air hole 50, and a cylindrical conductive fixed electrode 51 projects upwards from the end of the valve 1. By inserting the moving electrode 52 in the fixed electrode 51 with play, an opposing area variable capacitance electrode 11 is formed.

As the embodiment shown in FIG. 10, a variable capacitance electrode 11 can be provided at the upper end of a yoke 44. In a cap-like electrode holder 53 on the upper surface of the yoke 44, a fixed electrode 51 similar to that described above is provided, and a moving electrode 52 projects from the upper end of a valve 1 through an air hole 50 and is disposed within the fixed electrode 51 with play.

In a valve operating mechanism which has a voice coil motor type electromagnetic actuator 42 as shown in FIGS.

9 and 10, owing to opening/closing variation of the position of the valve 1, an opposing area between the fixed and moving electrodes 51 and 52 is changed. This acts to vary the electrostatic capacitance, thereby ending detection of a vertical position of the valve 1 at high accuracy.

Figure 11:
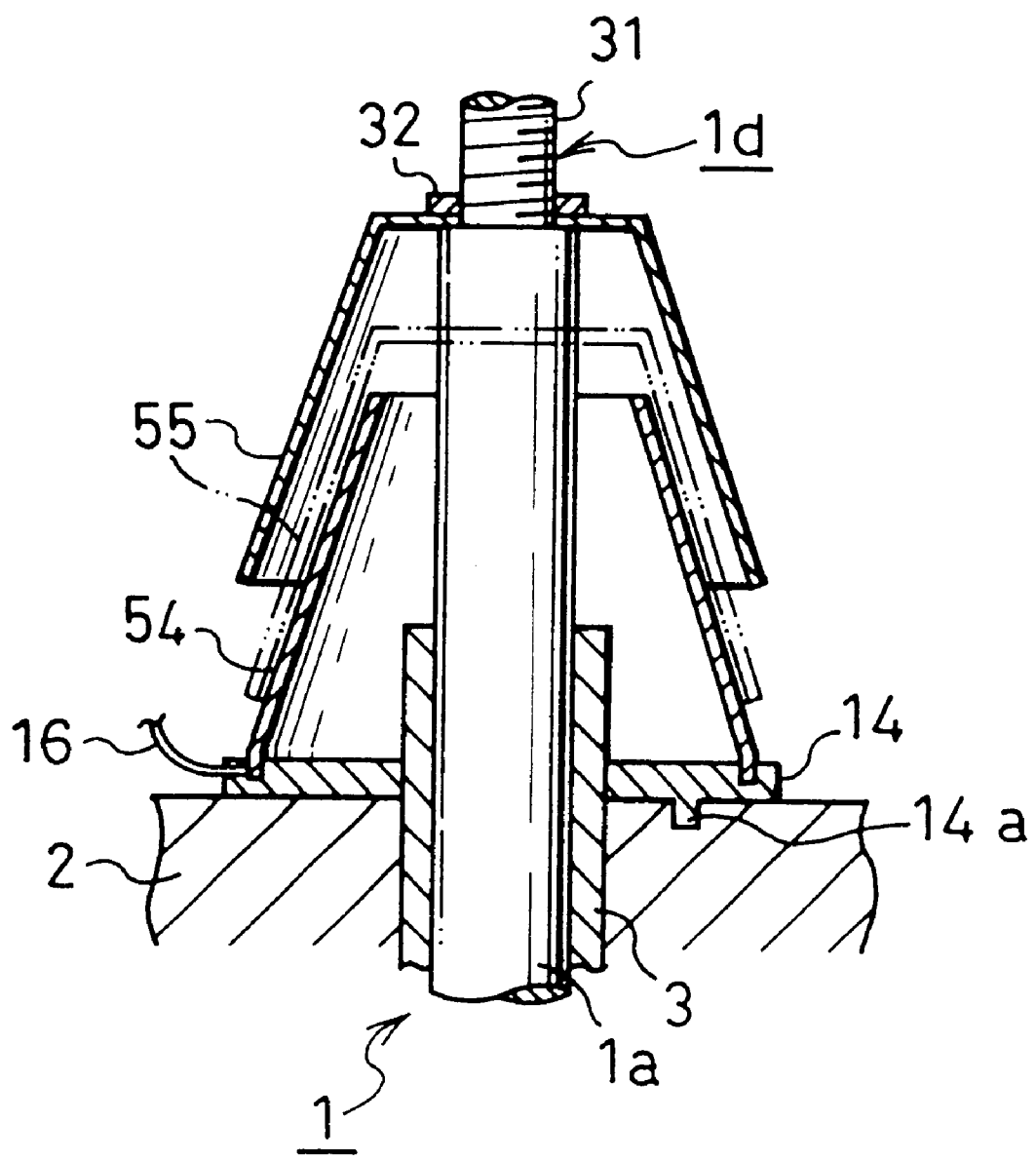
FIG. 11 is a central vertical sectioned front view of a variation of a variable capacitance electrode in FIG. 5.

FIG. 11 illustrates a variation of the variable capacitance electrode shown in FIG. 5. A frustum-shaped fixed electrode 54 is covered with a fristum-shaped moving electrode 55 to form an opposing distance varying electrode. Vertical movement of the moving electrode 55 changes a distance between it and the fixed electrode 54 and electrostatic capacitance, so that a position of the valve 1 can be determined.

The opposing surfaces of the electrodes 54 and 55 are inclined with respect to an axis of the valve 1, so that variation in relative distance between the electrodes 54 and 55 can be decreased with respect to axial movement of the moving electrode 55. Therefore, compared with an ordinary opposing distance changing sensor in which flat electrodes are opposed to each other, sensitivity is increased, and the invention is also applicable to a high-lift type valve. Such an opposing distance variable capacitance electrode may be applied to the embodiment in FIG. 1.

The present invention is not limited to the foregoing embodiments, for example the moving electrode in FIG. 1 and the dielectric in FIG. 4 may be formed in an upside down cup-shaped configuration and may be directly mounted to the valve stem 1a of the valve 1. The fixed electrodes 12, 26, 27, 29, 54 in FIGS. 1, 4, 5 and 11 may be placed in a bore in the cylinder head 2 and the moving electrode or dielectric (as the case may be) can be positioned above or within it. Thus, a projection of the variable capacitance electrode from the cylinder head becomes shorter, thereby decreasing the size of the whole valve operating mechanism and cylinder head.

In the embodiments in FIGS. 1, 4, 6 and 7, the moving electrode 13 and the dielectric 28 may be fixed to the valve spring retainer 5 by adhering, screwing, meshing and welding instead of press-fitting. The moving electrode shown in FIG. 1 may be integrally formed with the valve spring retainer 5.

In the embodiments of FIGS. 1 and 5, the fixed electrode 12, 29 can be positioned inside the moving electrode 13, 30. In the embodiment of FIG. 11, the fixed electrode 54 may be positioned around the moving electrode 55.

In the embodiments of FIGS. 1 and 5, the fixed electrodes 12, 29 may be electrically connected to the cylinder head 2 as earth potential (grounded), and the moving electrode 13, 30 may be insulated against the valve spring retainer 5 and connected to a lead.

In the embodiments of FIGS. 1 and 4, to prevent foreign substances from invading between the electrodes, a bellows-like cover 18 may be provided to cover an inner opening end, as shown by a two-dotted line.

In the embodiments of FIGS. 6 and 7, the variable capacitance electrode 11 may comprise an opposing area varying type as shown in FIG. 1. The present invention may be applied to a rocker arm valve operating mechanism or a hydraulic valve operating mechanism.

Other modifications and changes may be made by person skilled in the art without departing from the scope of claims wherein:

What is claimed is:

1. A valve position detector, for detecting a position of a poppet valve driven by a valve operating mechanism, a valve stem of said valve being slidably supported by a cylinder head, said detector comprising:

a variable capacitance electrode of an electrostatic capacitance sensor configured for detecting a position of said valve by detecting a variation in electrostatic capacitance when said valve is moved, said variable capacitance electrode being provided between said cylinder head or a stationary member integrally formed therewith, and said valve or a member which follows said valve, wherein said variable capacitance electrode further includes:

a cylindrical fixed electrode which surrounds a valve stem of said valve concentrically with said valve stem, and is carried by the cylinder head;

a cylindrical moving electrode carried by a valve spring retainer fixed to said valve, said fixed electrode and said moving electrode being configured so that they can be at least partially overlapped to form an opposing area varying to provide variable capacitance; and further comprising a tubular cover mounted between the valve spring retainer and the fixed electrode, configured to prevent foreign substances from invading between said two electrodes.

2. A valve position detector as claimed in claim 1, wherein said moving electrode is connected to a lead which is connected to a measuring circuit which further includes:

a coil; and a high frequency power source connected to a resistance in series, in parallel and configured to convert variation in electrostatic capacitance to a voltage which can be used to determine a position of the valve.

3. A valve position detector as claimed in claim 2 wherein said moving electrode is grounded.

4. A valve position detector as claimed in claim 1, said tubular cover further having an inner circumferential surface of said cover being elastically pressed on an outer circumferential surface of said moving electrode.

5. A valve position detector as claimed in claim 1, further comprising:

an inner fixed electrode mounted to the cylinder head;

an outer fixed electrode mounted to an insulating support plate which is fixed to the cylinder head; and a dielectric configured to be inserted between said fixed electrodes, and mounted to a valve spring retainer, together configured to form an inductance varying electrode.

* * * * *